Feb. 12, 1929.
G. BAILHE
1,701,906
ACCELERATOR FOR MOTOR VEHICLES
Filed March 21, 1927  3 Sheets-Sheet 1
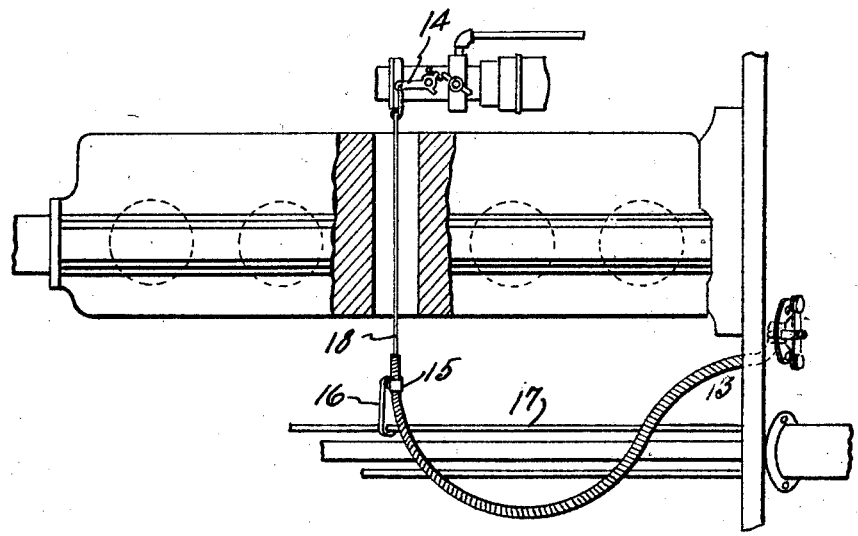
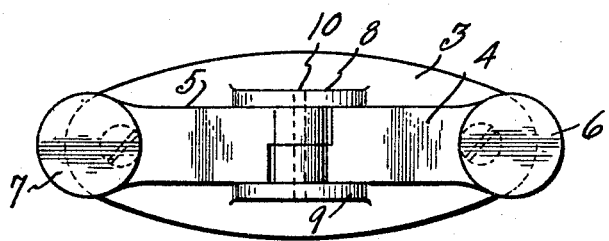
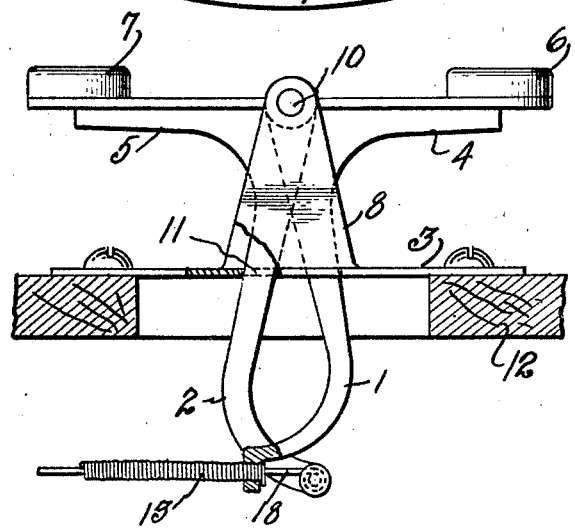
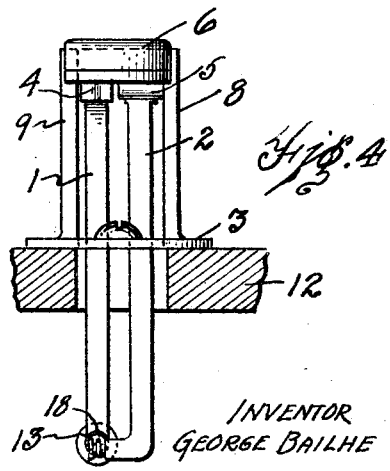
INVENTOR
GEORGE BAILHE
BY
Homer C Underwood
ATTORNEY.

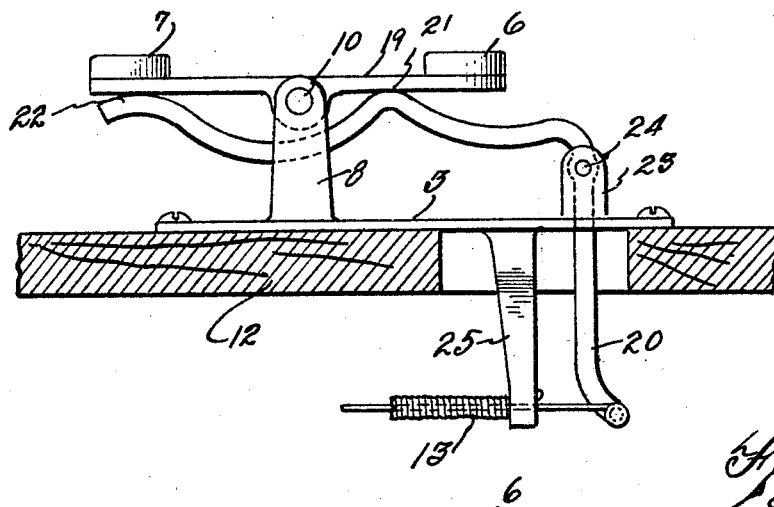
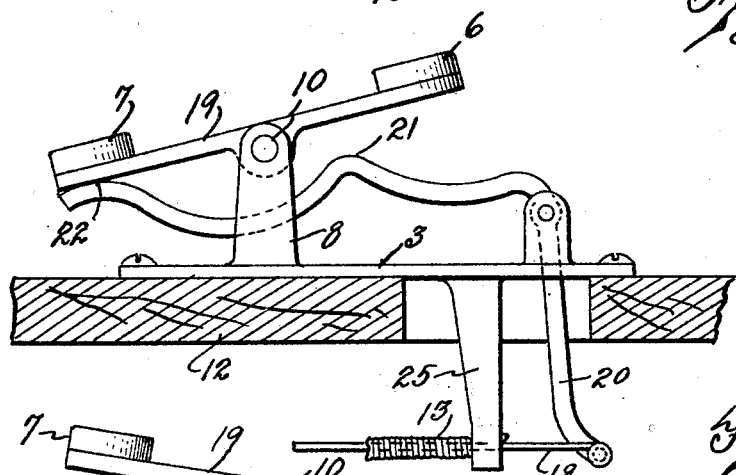
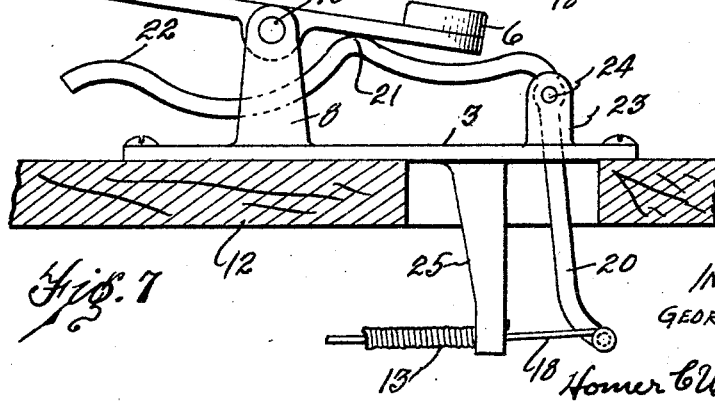

Feb. 12, 1929.

G. BAILHE

ACCELERATOR FOR MOTOR VEHICLES

Filed March 21, 1927

INVENTOR
GEORGE BAILHE
BY Homer E Underwood
ATTORNEY.

Patented Feb. 12, 1929.

1,701,906

UNITED STATES PATENT OFFICE.

GEORGE BAILHE, OF FORT WAYNE, INDIANA.

ACCELERATOR FOR MOTOR VEHICLES.

Application filed March 21, 1927. Serial No. 176,899.

My invention relates to accelerators for motor vehicles and has for its object to provide an accelerator of simple construction which may be produced at low cost, and particularly to provide a rest for the foot of the driver to lessen fatigue and permit the driver to change the position of his foot from ι central point of rest, by tilting his foot to either the right or left for the purpose of effecting acceleration of the vehicle. Some motor vehicles are so constructed as to require a push on the throttle lever, instead of a pull thereon, and a further object of my invention is to provide a construction which may be connected to develop a push on the throttle lever, if that is desired. A further object is to provide such a structure with means for connecting the same with the throttle control lever on the steering wheel, such as is commonly employed on automobiles, so that the car may be accelerated by operating the hand control, or by actuating the foot-pedal.

I have illustrated my invention in the accompanying drawings, in which:

Fig. 1 is a plan view of my accelerator applied to a motor vehicle, such as a Ford automobile.

Fig. 2 is a plan view of my foot pedal and foot-rest.

Fig. 3 is an elevation of my foot-pedal and its mounting to form a rest for the foot.

Fig. 4 is an end elevation of Fig. 3.

Figs. 5, 6 and 7 are elevations of modified forms of my accelerator, showing a single pivoted member operable by the foot-pedal mounted on the foot-rest.

Figure 8:
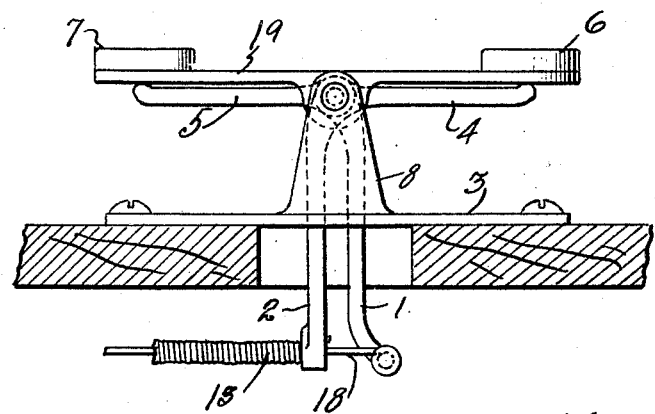
Fig. 8 is another modification in elevation showing the foot-pedal as a separate member to operate the mechanism shown in Fig. 3.

In the accompanying drawings reference numerals are employed to indicate the several parts. The foot-pedal assembly, perhaps best illustrated in Fig. 3, comprises a pair of members, 1 and 2 which are pivotally mounted near the upper end of a support which forms a rest for the foot. The members 1 and 2 may be curved near the bottom as shown in Fig. 3, and the upper ends, 4 and 5 extended laterally from the pivot point to form pedals for the reception of the foot and either of which may be pressed downwardly by the foot without disturbing the normal position of the other. Rubber buttons 6 and 7 may be provided on the ends of these pedal members to form an easy contact for the foot. The support for the foot-pedal members may consist of a plate 3, provided with up-standing lugs 8 and 9, which form a foot-rest and apertured near the top to receive a pin 10 which forms a pivot on which the members 1 and 2 may turn and be supported. The plate 3 may be provided with a rectangular opening 11 for the reception of the members 1 and 2 so that when said members are in their normal positions the ends of this opening 11 will form a stop to prevent said members moving except toward each other. The necessity for such stop will appear from a further description of the operation of the device. The plate 3 is mounted on the floorboard 12 of the vehicle in any suitable manner.

To the lower end of the member 1 is secured a flexible guide or armor 13 which may be constructed of wound wire leaving a central opening therein, but must be made flexible to accomplish the purpose of my invention in certain respects. This guide or armor 13, where it is desired to secure a pull on the throttle lever 14, must be secured near its opposite end to a trunnion block 15, which in turn may be connected to an arm 16 rigidly secured to the throttle control rod 17 leading to the throttle control lever of the steering wheel, so that the fuel supply may be controlled from the steering wheel, and the construction of which is well understood and need not be further described. The wire or cable 18 is connected to the lower end of the lever 2 and passed through the armor or guide 13 and connected at its opposite end to the throttle lever 14 as shown in Fig. 1. It will be understood that the wire 18 and encasing armor 13, constitute what is known as the Bowden wire.

The operation of this assembly will be readily understood. When the foot lever 2 is actuated by the pressure of the foot on the lateral extension thereof, the wire or cable 18 will be drawn with it and develop a pull on the throttle lever to open the throttle, the resistance to the motion offered by the throttle lever 14 not being sufficient to disturb the form of the loop in the armor 13. When the lever 1 is actuated by pressure of the foot on its lateral extension, the armor 13 will be pushed in the opposite direction, and because it is held by the trunnion block 15 at its opposite end, cannot move end-wise or linearly, and the result is that the loop is extended or changed in form and the wire 18, being closely encased by the armor 13, is bent in the same way. The wire is held from further motion by the inner end as it is connected to the arm 2 and the latter abuts against the edge of the opening in the floor-plate 3. But the opposite end connected to the throttle 14 can move if the resistance of the throttle lever is overcome which may be readily done as this resistance is very slight. The result of extending or changing the form of the loop of the armor is therefore to carry along with it the wire 18 and pull on the throttle lever 14 to open the throttle, just as when the wire itself is drawn through the armor by the foot operated lever 2. When the throttle control lever on the steering wheel is operated, the arm 16, rigidly connected therewith, bends or kinks the armor 13 where the trunnion block is connected to it, which causes a pull on the throttle lever, as will be obvious.

Figure 9:
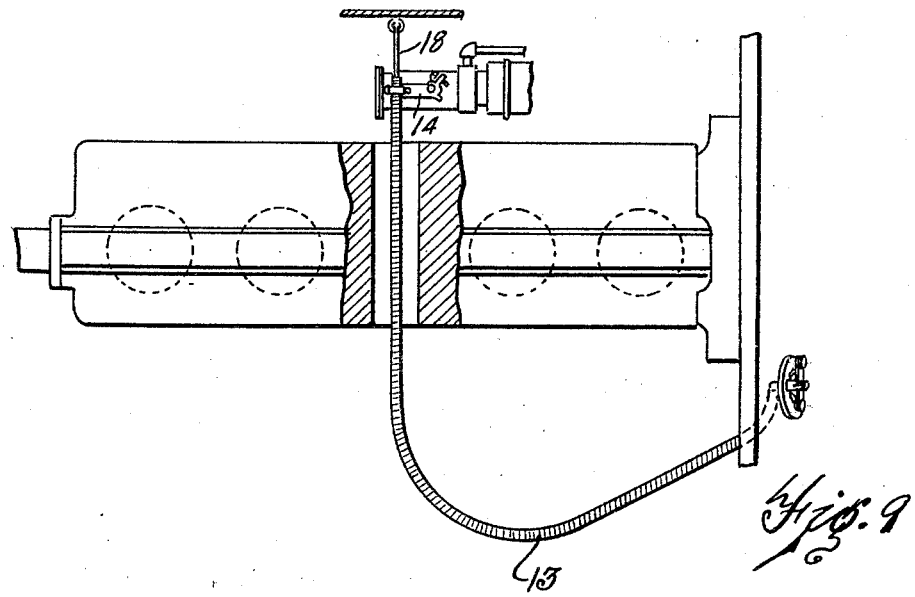
Fig. 9 is a plan view, similar to Fig. 1, but illustrating how the connections of the several parts may be changed to develop a push on the carburetor lever.

In some types of automobiles the throttle lever must be moved outwardly or in a direction opposite to that above described. To adapt applicant's invention to exert a push on the throttle lever, instead of the pull above described, the arrangement illustrated in Fig. 9 is employed. The foot-operated levers 1 and 2 and their connection with the armor 13 and wire 18 are the same as in the form shown in Figs. 1 to 4, but the arm 16, operated by the throttle control rod 17 is omitted, the wire is connected to a fixed part of the automobile beyond the throttle valve, as indicated in Fig. 9, and the outer end of the armor is connected directly to the throttle lever. With this arrangement it will be seen that when the foot lever 1 is operated to push the armor 13 endwise, it is held from deflection or change in the form of the loop because the wire 18 is fixed at both ends and acts as a guide. The result is that the armor 13 is thrust longitudinally along the wire 18 as a guide and pushes the throttle lever outwardly. On the other hand, if the foot lever 2 is operated to exert a pull on wire 18, the movement at the end of the wire slightly straightens out the loop in the armor, and as the inner end of the armor cannot move, the change in the form of the loop effects a movement of the armor along the wire towards the throttle lever to cause outward motion of the extreme end of the armor and the desired motion of the throttle lever 14.

Another modification of my device is shown in Fig. 8, in which the lateral extensions 4 and 5 of the members 1 and 2 are not operated directly by the foot, but by a separate foot-pedal 19, which may be a single plate pivoted to the support 8 and may be rocked in one direction to actuate one of said members and in the opposite direction to operate the other member.

In Figs. 5, 6 and 7 I have shown still another modification in which a single movable member 20, of irregular formation developing high points 21 and 22 is employed to form contacts with the foot-pedal 19. The member 20 is supported on a lug 23 formed on the plate 3 and adapted to turn on the pivot pin 24. When the foot-pedal is pressed against either of the high points 21 or 22, the throttle of the carburetor will be opened as before. To form a support to which the guide member 13 may be fixed, I provide an arm 25 fixed to and depending from the plate 3.

It will be observed that in all of the foregoing constructions the foot may rest against the lugs forming the support for the foot-pedal and at the pivot point so that the vehicle may be accelerated by turning the foot either to the right or left from this central point of rest.

Having fully described my invention and its mode of operation, what I claim is:

1. Means for causing motion of a part comprising, in combination, a part adapted for motion, a flexible operating means therefor consisting of a wire and an encasing armor a portion of which is formed into a loop, two movable operating members to which the inner ends of the wire and armor are respectively connected, and means to limit their motion in one direction, one of said flexible operating members being connected at its other end to the part to be moved and the other member being fixed against lineal motion beyond the loop opposite the inner end thereof.

2. In an accelerator for motor vehicles, in combination, a throttle lever, flexible operating means therefor comprising a wire and an encasing armor a portion of which is formed into a loop, two movable operating members to which the inner ends of the wire and armor are respectively connected, means to limit their motion in one direction, one of said flexible operating members being connected at its outer end to the throttle lever and the other member being connected to a part of an automobile so as to preclude lineal motion.

3. Means for causing motion of a part comprising a part to be moved, a two-part flexible operating means therefor, one of said parts consisting of a wire and the other part consisting of an encasing armor surrounding the wire, both formed into a loop, the outer end of one of said parts being connected to the part to be moved, and the other member near the corresponding end being fixed against lineal motion, means for moving the inner ends of said two-part flexible means comprising two movable elements whose motion is limited in one direction, one of said elements connected to one of said flexible operating parts and the other to the other of said parts.

4. In an accelerator, in combination, a throttle lever, a Bowden wire the outer end of the inner member of which is connected to the throttle lever, operating means for the Bowden wire consisting of independently movable members connected respectively to the inner ends of the respective members of the Bowden wire, a pivotally mounted arm connected to the outer member of the Bowden wire adapted to move it laterally but prevent its lineal motion, and a loop formed in the Bowden wire between said arm and the movable wire operating member at the inner end.

5. An accelerator pedal comprising a support, angle levers pivotally connected therewith having arms extending in opposite directions therefrom, and a foot plate centrally pivoted on said support and having its opposite ends overlying said arms.

Signed at the city of Fort Wayne, county of Allen and State of Indiana, this 28th day of February, 1927.

GEORGE BAILHE.